(12) United States Patent
Moghal

(10) Patent No.: US 11,716,323 B1
(45) Date of Patent: Aug. 1, 2023

(54) ADAPTIVE STEP-UP AUTHENTICATION FOR PRIVILEGED INTERFACE INVOCATIONS

(71) Applicant: Amazon Technologies, Inc., Seattle, WA (US)

(72) Inventor: Mohammad Salman Moghal, Mississauga (CA)

(73) Assignee: Amazon Technologies, Inc., Seattle, WA (US)

( * ) Notice: Subject to any disclaimer, the term of this patent is extended or adjusted under 35 U.S.C. 154(b) by 355 days.

(21) Appl. No.: 17/001,292

(22) Filed: Aug. 24, 2020

(51) Int. Cl.
*H04L 9/40* (2022.01)
*G06F 9/54* (2006.01)

(52) U.S. Cl.
CPC ............ *H04L 63/0853* (2013.01); *G06F 9/547* (2013.01); *H04L 63/20* (2013.01); *H04L 63/102* (2013.01)

(58) Field of Classification Search
CPC .............................. H04L 63/0853; G06F 9/547
USPC .............................................................. 726/1
See application file for complete search history.

(56) References Cited

U.S. PATENT DOCUMENTS

2020/0125754 A1\* 4/2020 Waldron et al. ..... H04L 9/0894
2021/0303644 A1\* 9/2021 Shear .................... G06F 16/93

\* cited by examiner

*Primary Examiner* — Anthony D Brown
(74) *Attorney, Agent, or Firm* — Lee & Hayes, P.C.

(57) ABSTRACT

Techniques for a service provider network to perform adaptive, step-up authentication for client devices that invoke privileged API calls for services. A client device may perform an initial authentication protocol with an identity service provider (ISP), and be provided with a JSON web token (token) that enables the user to interact with a service of the service provider network according to an access scope. When the service provider network receives an API call from the client device, the service provider network may determine that the API call is a privileged API call. The service provider network may further determine that the privileged API call is not permitted by the access scope of the token. The service provider network may then require that the client device perform a step-up authentication process with the ISP to obtain another token with an elevated access scope to invoke the privileged API call.

20 Claims, 12 Drawing Sheets

US 11,716,323 B1

ADAPTIVE STEP-UP AUTHENTICATION FOR PRIVILEGED INTERFACE INVOCATIONS

BACKGROUND

Service provider networks offer cloud-based services to fulfill subscribers' computing-service needs without the subscribers having to invest in and maintain computing infrastructure required to implement the services. These service provider networks may provide many different types of backend services to subscribers, such as on-demand computing services, data-management services, software-execution services, application-hosting services, and various other types of services. Due to the ease of having service provider networks provide and manage the computing infrastructure on behalf of subscribers, users continue utilize cloud-based networks to provide and/or host backend services that are accessible over the Internet.

These backend services are often managed, accessed, or otherwise interacted with using interfaces such as application programming interfaces (APIs), such as Representational State Transfer (RESTful or REST) APIs, Simple Object Access Protocol (SOAP) APIs, and the like. These APIs provide accessibility and usability to users of cloud-based services over the Internet using the HyperText Transfer Protocol (HTTP), such as by allowing users to retrieve a resource, put or change the state of a resource, create a resource, delete a resource, etc. While it is advantageous to interact with cloud-based services over the Internet using APIs, these backend services often manage or store sensitive or private data, such as personal user information, financial information, business-related information, health information, and so forth.

In light of the sensitive data that is often managed by these backend services, service provider networks may experience various types of attacks from malicious entities, or may receive requests for data from unauthorized entities. Various types of security practices or techniques are in place to protect REST APIs, such as basic authentication techniques (e.g., username and password), temporary time-sensitive tokens, and so forth. While these security practices help provide resources of backend services with a credentials-centric approach, the security practices tend to be rigid and unscalable across API endpoints.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
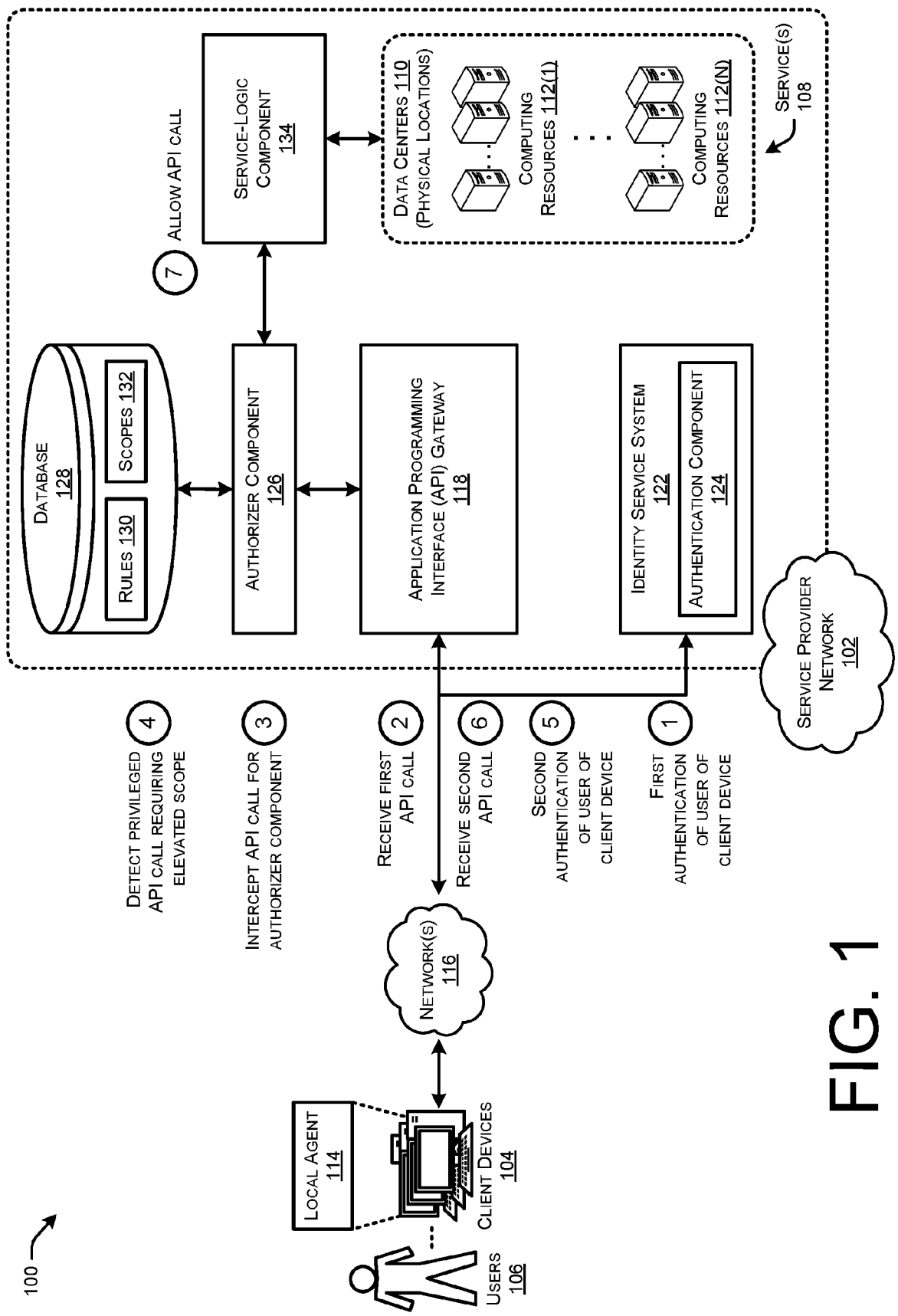
FIG. 1 illustrates a system-architecture diagram of an example environment in which an API gateway of a service provider network works in conjunction with an authorizer component to determine that an API call from a client device requires step-up authentication. Specifically, the authorizer component determines that the API call is privileged and not permitted under an access scope of a JavaScript Object Notation (JSON) web token received from the client device, and that a step-up authentication process is required for the client device to obtain another JSON web token with the required access scope to invoke the API call.

This disclosure describes, at least in part, techniques for a service provider network to perform adaptive, step-up authentication for client devices that invoke privileged API calls for backend services of the service provider network.

In some examples, a client device may perform an initial authentication protocol with an identity service provider (ISP), such as by providing a username and password, and be provided with a JSON web token (also referred to herein as "token" or "JWT token") that enables a user of the client device to interact with a backend service according to an access scope of the token. An API gateway of the service provider network may receive an API call from the client device along with the token obtained by that client device. The API gateway may work in conjunction with an authorizer component (e.g., a serverless function) to determine whether the API call is a privileged API call. For instance, the authorizer component may intercept the API call from the API gateway, and prior to invocation of the API call on the backend service, to determine whether the API call is a privileged API call (e.g., accessing sensitive information, performing a privileged operation, etc.).

Upon determining that an API call is a privileged API call, the authorizer component may determine whether the privileged API call is permitted by an access scope of the token received from the client device. In examples where the privileged API call is not permitted by the access scope of the token, the service provider network may notify the client device that a step-up authentication process is required to obtain an elevated access scope to invoke the privileged API call. The client device may then perform an additional authentication protocol with the ISP to obtain another token with elevated access scope in order to invoke the privileged API call. In this way, API gateways and client devices may use JSON web tokens to convey access scopes that are evaluated for rule-based invocation of API calls, thereby achieving stateless, adaptive step-up authentication for privileged API calls.

Service provider networks, such as cloud platforms, provide or host various types of backend services. For instance, backend services may include business-application services, financial-institution services, healthcare services, and so forth. Client devices often interact or access these backend services over a network, such as the Internet, using API calls that define an operation or interact that the client device is requesting be performed. For example, an application or agent may be running locally on a client device, and upon receiving input indicating an interaction to be performed with the backend service, the local agent may send a REST API call over the Internet to an API gateway of the service provider network that is hosting the backend service. The API gateway generally routes the API call to business logic that invokes the API call and performs the requested operation on the backend service.

However, these services store and manage various types of information that can range from publicly available information all the way to highly sensitive information (e.g., personal-user information, financial information, business-related information, health information, etc.). Accordingly, while it may advantageous to generally allow users to access less sensitive information, it may be necessary to also restrict some users from accessing more sensitive information. Similarly, it may be advantageous to allow some operations to be performed on less sensitive information (e.g., retrieve information, view information, etc.), and also restrict some operations from being performed on more sensitive information (e.g., read-only information, prevent deletion of information, etc.).

Various techniques exist for authenticating a user of a client device. For example, in order to interact with a backend service of a service provider network, client devices may perform an authentication protocol with a trusted identity service provider (ISP) (e.g., provide a username and password) to receive a set of trusted credentials that are usable to gain access the backend service. However, certain authentication techniques are vulnerable to attack, such as spoofing attacks, phishing attacks, brute-force attacks, and so forth. Accordingly, these authentication protocols may be sufficient for accessing various information, but it may be advantageous for users of client devices to perform one or more additional authentication protocols with the ISP in order to achieve an elevated level of trust in order to access more sensitive information.

To track client devices, API gateways attempt to maintain service-side state (e.g., HTTP cookies, stateful tokens, etc.) and force user devices to send their API calls through a single endpoint of the API gateway. In this way, the single API endpoint can track the client devices and redirect to additional authentication challenges. However, single-API endpoint approaches coupled with service-side state management suffers from various inefficiencies. For instance, these approaches do not scale in stateless application design because maintaining state for all client devices requires large amounts of storage and processing, client devices are unable to operate independently of the infrastructure of the API gateway, etc.

The techniques described herein provide a pluggable, stateless adaptive step-up authentication for client devices that send API calls to API gateways in order to interact with backend services of a service provider network. The techniques described herein include the use of JSON web tokens to convey access scope by using the tokens as API keys. Generally, JWT tokens act as a set of assertions about who the user of a client device is, and what that user can do with respect to a backend service. An access scope of a JWT token may generally correspond to, or represent, a list of actions that the holder of the JWT token (e.g., user of a client device) is permitted to perform on the backend service.

To obtain a JWT token to access a backend service, a user of a client device may perform an initial authentication protocol with a trusted ISP, and the ISP may provide a signed JWT token to the user that generally has an access scope commensurate to an amount of trust established using the authentication protocol. The client device may then begin sending API calls to the API gateway using the JWT token as an API key such that each API call independently conveys access scope for the user in each API call.

Rather, than invoking the API calls received from client devices, the API gateway may include, and/or work in conjunction with, an authorizer component (e.g., serverless function) that intercepts API calls prior to invocation for the backend service. The authorizer component may query a rules database to identify a rule for the API call. Generally, the rules database may store rules that indicate API payloads for specific API calls that, if detected in an API call, indicate that the API call is a privileged API call that requires elevated access scope to invoke. In an example of a financial-institution service, an API call for transferring money between accounts may not be considered privileged if the payload indicates that the amount of money is less than a threshold (e.g., $100, $1,000, etc.), but if the payload indicates that the amount of money is greater than the threshold, then the API call may be considered a privileged API call based on the rule for that API call.

The authorizer component may determine whether the API call amounts to a privileged API call based on a rule for that API call. In situations where the API call is not a privileged API call that requires an elevated access scope, the authorizer component may simply allow the API call to progress to a service-logic component to invoke the API call. In examples where the authorizer component determines that the API call is a privileged API call, the authorizer component may determine whether the JWT token has elevated access scope required to perform the privileged API call. In some instances, the rules database may further store a mapping between privileged API calls and access scopes that are permissible for invoking the privileged API calls. If the JWT token has an elevated access scope that is required for performing the privileged API call, the authorizer component may allow the privileged API call to progress to the service-logic component to invoke the privileged API call.

However, in examples where the authorizer component determines that the API call is a privileged API call, but that the JWT token does not have an elevated access scope needed to invoke the privileged API call, the authorizer component may determine that the user of the client device needs to perform a step-up authentication process. The authorizer component may trigger a process that results in a notification being sent to the client device that indicates the user needs to perform one or more additional authentication protocols with the ISP to perform the privileged API call. Further, the process triggered by the authorizer component may include notifying the ISP about the elevated access scope that is required by the client device. In this way, the ISP is able to determine a specific JWT token having appropriate elevated access scope to generate for the client device, and/or may further determine a type of authentication protocol and/or number of additional authentication protocols to perform with the user of the client device in order to establish enough trust to generate the JWT token having the elevated access scope. In this way, the service provider network may implement a stateless, adaptive step-up authentication architecture in order to ensure that client devices are only able to invoke privileged API calls after performing appropriate authentication protocol(s) with ISPs to establish required levels of trust.

In some examples, the authorizer component may be a pluggable mechanism in that the authorizer component is capable of being implemented in any service provider network and/or in conjunction with any API gateway. For instance, the authorizer component may be configured to determine a type of the API gateway, and determine a context or semantics that the API gateway uses to communicate. The authorizer component may modify the context of communications sent to and from the API gateway in order to communicate with any API gateway. Thus, the authorizer component (which may comprise a container, serverless function, etc.) may modify context for communications with API gateways such that the authorizer component is capable of being inserted or plugged into any service provider network and/or communication with any API gateway by modifying the context of communications to be understandable by the API gateway.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider network 102 communicates with one or more client devices 104 and performs adaptive, step-up authentication for the client devices 104 that invoke privileged API calls for backend services of the service provider network 104.

In some examples, the service provider network 102 may comprise clusters of managed servers stored in data centers located across geographic areas. The service provider network 102 may be a distributed network through which users (often customers) may interact via client devices 104 to manage or otherwise interact with services 108 provided by the service provider network 102. The service provider network 102 may be managed by a service provider, and may provide various types of services 108, such as an on-demand computing service, a message-queuing service, a managed-database service, a software-execution service, application-hosting services, business-application services, financial-institution services, healthcare services, and/or other services 108. The services 108 may be a collection of computing resources configured to instantiate VM instances, containers, network functions, etc., and to provide other types of computing resources on demand. Other applications for the services 108 may be to support database applications, electronic commerce applications, business applications and/or other applications. The message-queuing service 108 maybe a managed message queuing service that enables users to send, store, and receive messages between software components at any volume without losing messages or requiring that other services 108 be available.

The services 108 described above, and any other services, may be provided in one particular implementation by one or more data centers 110 operated by the service provider. As known to those skilled in the art, data centers 110 are facilities utilized to house and operate computing resources 112, such as computer systems and associated components. Data centers 110 also typically include redundant and backup power, communications, cooling, and security systems. The data centers 110 might be located in geographically disparate regions, and might also be connected to various other facilities, such as co-location facilities, and various wide area networks ("WANs"), such as the Internet.

The resources 112 described briefly above might also be provisioned and de-provisioned as needed in an automated fashion. For example, the service provider network 102 might be configured to instantiate a new instance of a computing resource 110, such as a VM instance, in response to an increase in demand for a network service or other condition. Other types of computing resources 110 might also be provisioned and de-provisioned in a similar manner. Services 108 in the service provider network 102 might also provide functionality for automatically scaling and/or de-scaling resources 112 based upon demand for the resources 112 and/or other factors.

In some examples, users 106 may interact with services 108 using client device 104. Generally, the client devices 104 may be any type of computing device capable of connecting to the service provider network 102 via a suitable data communications network 116 such as, but not limited to, a laptop or desktop computer, a tablet computing device, a server computer, or a mobile telephone. Administrative users employed by the operator of the service provider network 102, such as administrators managing the operation of the service provider network 102, might also connect with, manage, and utilize resources provided by the service provider network 102 in a similar fashion.

According to the techniques described herein, users 106 of the service provider network 102 may subscribe for an account with the service provider network 102 to utilize the computing infrastructure (e.g., computing resources 112 in data centers 110) supporting the services 108 (e.g., memory, processing power, auto-scaling, networking and content delivery, etc.) provided for and managed by the service provider network 102. The service provider operating the service provider network 102 may charge a fee for utilization of the resources 112 to a subscriber that have computing resources 112 provisioned to support and use services 108.

Generally, the client devices 104 may be operated by the users 106 of a service 108. The users 106 may be one or more of individual users, groups of users, organizations, businesses, or other entities that interact with the service provider network 102 via respective client devices 104. The client devices 104 may be any type of computing device capable of connecting to the service provider network 102 via a suitable data communications network 116 such as, but not limited to, a laptop or desktop computer, a tablet computing device, a server computer, or a mobile telephone. Additionally, the client devices 104 may have various components, algorithms, software, client applications, and so forth, to perform authentication methods with identity service providers. For instance, the client devices 104 may have a software client for communicating using various network protocols, including cryptographic network protocols, such as FTPS protocol STP protocol, Web Authentication (WebAuthn) protocol, Universal 2$^{nd}$ Factor (U2F) protocol, Universal Authentication Framework (UAF) protocol, and/or any other authentication protocol.

To utilize the services 108, the client devices 104 may initially perform various authentication techniques with an identity service system 122. In some instances, the identity service system 122 may be included in, or managed by, the service provider network 102. However, in other examples the identity service system 122 may be a separate entity from the service provider network 102 (e.g., PingFederate, Duo Security, OneLogin, Auth0, Okta, etc.). The identity service system 122 may configured to perform authentication protocols with the users 106 of the client devices 104 in order to establish trust and/or issue credentials for accessing services 108 of the service provider network 102. In order to log in to use a service 108, or otherwise access a service 108, a user 106 may access a local agent 114 running on the client device 104, where the local agent 114 is software that is associated with the services 108. The local agent 114 may determine the user would like to use the service 108, and begin an initial authentication with the identity service system 122 to obtain credentials.

At "1", the local agent 114 may use the client device 104 to perform a first authentication of the user 106 of the client device 104. For instance, the identity service system 122 may include an authentication component 124 that performs one or more authentication protocols with the client device 104 to establish trust with the user 106 of the client device 104. Any type of authentication protocol may be used at "1" that is known in the art, such as using registered usernames and passwords. After the user 106 completes the first authentication protocol, the authentication component 124 may generate a JSON web token and provide the token to the client device 104. The token may be associated with an access scope that acts as a set of assertions about who the user 106 of a client device 104 is, and what the user 106 can do with respect to the service 108. An access scope of a JWT token may generally correspond to, or represent, a list of actions that the user 104 that holds the JWT token is permitted to perform on the backend service 108.

The user 104 may utilize the local agent 114 to interact with the services 108 using the token. For instance, the local agent 114 may determine that input from the user 106 indicates that the user 106 would like to interact with the service 108. In such examples, the client device 104 may, at "2", send an API call over the network(s) 116 to an API gateway 118 of the service provider network 102, which may receive the first API call. The API calls (e.g., REST API calls) described herein may generally be of a particular type that indicates what request, or what interaction, the user 104 would like to perform (e.g., POST, GET, PUT, PATCH, DELETE, etc.). Further, the API calls may include a payload around the request, such as parameters for the request and/or metadata. Even further, the API calls may include the JWT token to serve as an API key where the token is signed with a private key, and the JTW token indicates an access scope for the user 106 that sent the API call.

The API gateway 118 may receive the API call at "2," and rather than simply sending the API call to a service-logic component 134 for invocation to interact with the service 108, the authorizer component 126 may intercept the API call at "3." In some examples, the authorizer component 126 may determine whether the API call is privileged, or if any user that has a valid token can perform the API call. If the API call is a privileged API call, the API gateway 118 may route the API call to the authorizer component 126. In some instances, however, the API gateway 118 may simply route all API calls to the authorizer component 126 (e.g., some services 108 may require that all API calls be routed to the authorizer component 126. In some instances, every API call may be routed to the authorizer component 126 from the API gateway 118. In other examples, API calls may be routed to the authorizer component 126 from the API gateway based on the type of API call (e.g., API specific). For instance, the API gateway 118 may cache a policy document, or generate a policy document for each request, and evaluate the policy document against the API calls to determine whether the API calls are to be routed to the authorizer component 126.

The authorizer component 126 may receive the API call and, at "4," detect that the API call was a privileged API call that requires elevated access scope. In some instances, the authorizer component 126 may access a database 128 that stores rules 130 and corresponding scopes 132 for API calls. For instance, the authorizer component 126 may query the database 128 to identify a rule 130 for the API call. Generally, the database 128 may store rules 130 that indicate API payloads for specific API calls that, if detected in an API call, indicate that the API call is a privileged API call that requires elevated access scope to invoke. In an example of a financial-institution service, an API call for transferring money between accounts may not be considered privileged if the payload indicates the amount of money is less than a threshold (e.g., $100, $1,000, etc.), but if the payload indicates the amount of money is greater than the threshold, then the API call may be considered a privileged API call based on the rule for that API call.

The authorizer component 126 may determine whether the API call amounts to a privileged API call based on a rule for that API call. In situations where the API call is not a privileged API call that requires an elevated access scope, the authorizer component 126 may simply allow the API call to progress to the service-logic component 134 to invoke the API call. In examples where the authorizer component 126 determines that the API call is a privileged API call, the authorizer component 126 may determine whether the JWT token has elevated access scope required to perform the privileged API call. In some instances, the database 128 may further store a mapping between privileged API calls and access scopes 132 that are permissible for invoking the privileged API calls. If the token has an elevated access scope 132 that is required for performing the privileged API call, the authorizer component 126 may allow the privileged API call to progress to the service-logic component 134 to invoke the privileged API call. The invocation of the service-logic component 134 may be performed by any type of component, such as workloads, container-based workloads, serverless functions, virtual machines, sidecar components, and so forth.

However, in examples where the authorizer component 126 determines that the API call is a privileged API call, but that the JWT token does not have an elevated access scope needed to invoke the privileged API call, the authorizer component 126 determines that the user 106 of the client device 104 needs to perform an additional step-up authentication process. The authorizer component 126 may trigger a process that results in a notification being sent to the client device 104 that indicates the user 106 needs to perform one or more additional authentication protocols with the identity service system 122 to perform the privileged API call. Further, the process triggered by the authorizer component 126 may include notifying the identity service system 122 about the elevated access scope that is required by the client device 104. In this way, the identity service system 122 is able to determine a specific JWT token having appropriate elevated access scope to generate for the client device 104, and/or may further determine a type of authentication protocol and/or number of additional authentication protocols to perform with the user 106 of the client device 104 in order to establish enough trust to generate the JWT token having the elevated access scope.

At "5", the identity service system 122 and the client device 104 may perform a second authentication protocol to authenticate the user 106 of the client device 104 to establish a higher level of trust. In some instances, the client device 104 and identity service system 122 may simply perform another authentication process, but using a different authentication technique (e.g., SMS, biometric, token, and/or any other authentication technique). In some instances, the client device 104 and identity service system 122 may perform multiple authentication protocols depending on the access scope required to invoke the privileged API. After completing the second authentication protocol, the authentication component 124 may generate another JWT token that has the elevated access scope and provide the other token to the client device 104.

At "6", the API gateway 118 may receive a second API call to perform the privilege interaction. In this example, the second API call may include the second token with the elevated scope. The authorizer component 126 may determine that the second token has the appropriate elevated access scope using the database 128, and at "7", allow the API call to proceed to the service-logic component 134. The service-logic component 134 may include logic for invoking or performing actions on, or interactions with, the services 108 based on the API calls.

In this way, the service provider network 102 may implement a stateless, adaptive step-up authentication architecture in order to ensure that client devices 104 are only able to invoke privileged API calls after performing appropriate authentication protocol(s) with ISPs to establish required levels of trust.

Although the techniques are described with reference to REST APIs, the techniques are equally applicable to any type of request, including other web-based APIs. In some instances, the authorizer component 126 may comprise a pluggable component, such as a virtual machine, a container, a serverless function, etc., that is capable of being implemented in any service provider network 102 and/or in conjunction with any API gateway 118. For instance, the authorizer component 126 may be configured to determine a type of the API gateway 118, and determine a context or semantics that the API gateway 118 uses to communicate. The authorizer component 126 may modify the context of communications sent to and from the API gateway 118 in order to communicate with any API gateway 118. Thus, the authorizer component 126 (which may comprise a container, serverless function, etc.) may modify context for communications with API gateways 118 such that the authorizer component 126 is capable of being inserted or plugged into any service provider network 102 and/or communication with any API gateway 118 by modifying the context of communications to be understandable by the API gateway 118.

The authentication techniques described herein that are performed by the client device 106 and identity service system 122 may include any type of authentication method or protocol known. For instance, the authentication techniques may include public-key cryptography authentication, password-based authentication, two-factor authentication, risk-based authentication, biometric authentication, text-string identifier authentication, one-time password authentication, out-of-band authentication, and/or any other type of authentication technique.

Figure 2:
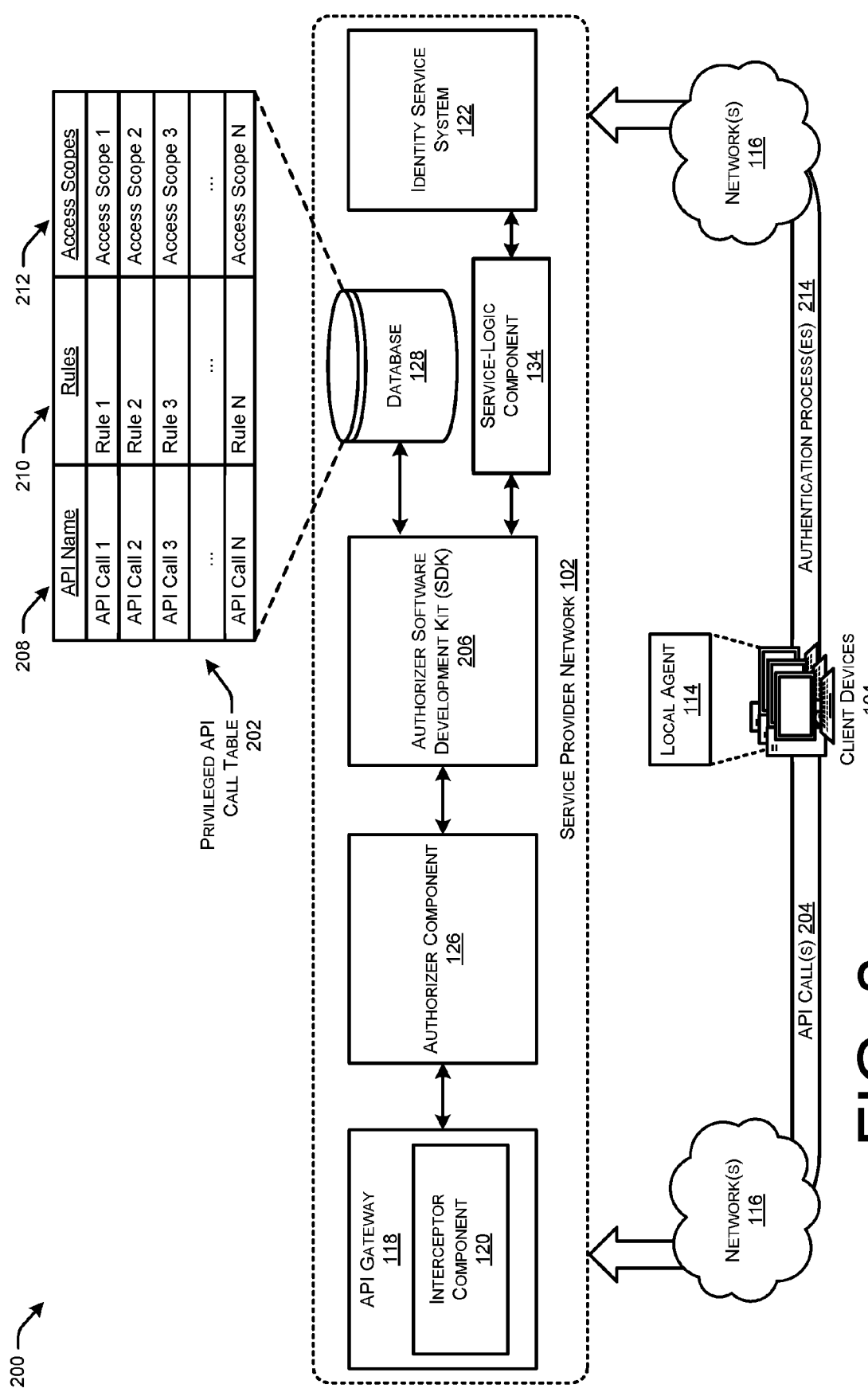
FIG. 2 illustrates a diagram of a privileged API call table that includes mappings between API calls, rules indicating payloads of those API calls that are privileged, and access scopes that are required to invoke the privileged API calls.

FIG. 2 illustrates a diagram 200 of a privileged API call table 202 that includes mappings between API calls 208, rules 210 indicating payloads of those API calls 208 that are privileged, and access scopes 212 that are required to invoke the privileged API calls 208.

The local agents 114 executing on the client devices 104 may send API calls 204 over the networks 116 to an API gateway 118. In some instances, a client device 104 may send API calls 204 to a same API gateway 118, or multiple API gateways 118 as the API gateways 118 do not need to maintain server-side state to track identities of users 104 of the client devices according to the techniques described herein. The API gateway 118 may receive the API calls 204, and the API gateway 118 may intercept the API calls and provide them to the authorizer component 126.

The authorizer component 126 may, in some examples, include and/or communicate with an authorizer software development kit (SDK) 206. The authorizer SDK 206 may comprise a custom-built library that operates to lookup rules from the database 128 using the API call name. The authorizer SDK 206 may locate the API name 208 in the table 202, and identify a rule 210 that is mapped to the API name 208. The rule 210 may generally define whether the API call and payload combination require a step-up challenge, or if the access scope for the token included in the API call 204 is sufficient. In examples where a step-up challenge is required, the client device 104 may perform one or more authentication processes 214 with the identity service system 122.

Generally, the rules 210 may be based on API name 208 such that, for every API call with a specific API name 208, step-up authentication is invoked. In other examples, the rules 210 may be based on payload such that an API call may or may not require step-up authentication depending on the payload being evaluated again the corresponding rule 210. In some instances, the database 128 and/or the identity service system 122 may further store digital fingerprint data (hashed) for the client devices 104. For instance, a hash of a digital fingerprint for a user profile of a client device 104 may be stored in the database 128 and/or the identity service system 122. In examples where an API request comes in from the user profile associated with the client device 104, a hash of a digital fingerprint associated with that API request may be compared to the stored hash of the digital fingerprint for that user profile to determine whether the hashes match. If the hashes do not match, the authorizer component 126 (and/or another component) may determine that step-up authorization is required.

Figure 3:
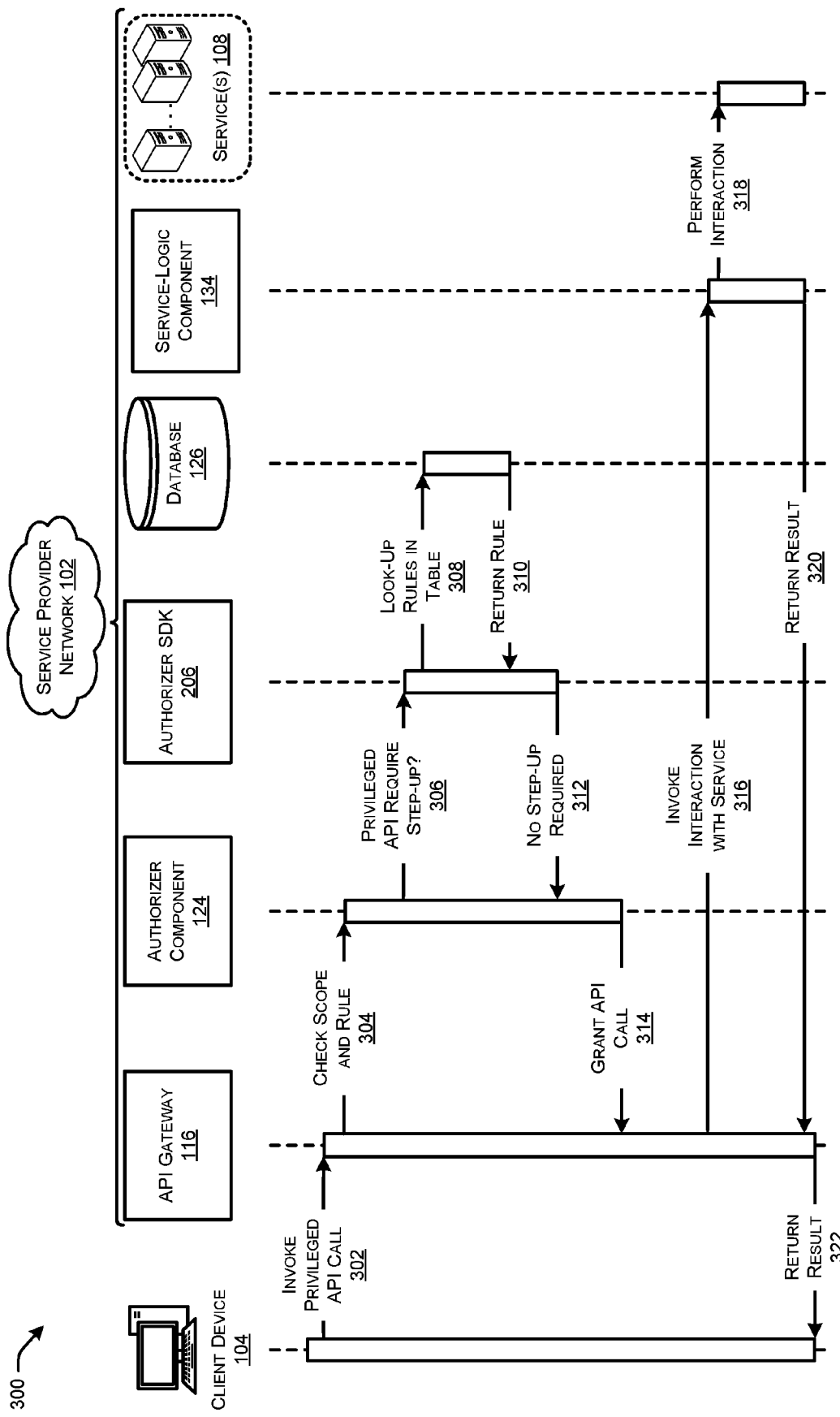
FIG. 3 illustrates a sequence diagram illustrating an example flow of interactions arranged in a time sequence for an API gateway and authorizer component of a service provider network to determine that an API call from a client device does not require elevated access scope.

FIG. 3 illustrates a sequence diagram 300 illustrating an example flow of interactions arranged in a time sequence for an API gateway 116 and authorizer component 124 of a service provider network 102 to determine that an API call from a client device 104 does not require elevated access scope.

At 302, the client device 102 may invoke a privileged API call by sending the privileged API call to the API gateway 116. At 304, the API gateway 116 may send a request to the authorizer component 124 to check the scope and rule for the privileged API call. The authorizer component 124 may receive the request, and at 306, cause the authorizer SDK 206 to determine whether the privileged API requires a step-up authentication.

At 308, the authorizer SDK 206 may perform a look-up in the privileged API call table 202 to identify a rule 210 associated with the privileged API call. The database 126 may receive the query, and at 310, return a rule 210 to the authorizer SDK 206 that is mapped to the privileged API call. The authorizer SDK 206 may determine that no step-up is required in examples where the payload of the API call does not qualify as privileged according to the rule 210 for the API call.

At 314, the authorizer component 124 may receive the indication that no step-up authentication is required, and grant the API call by sending an indication to the API gateway 116 to grant the API call. At 316, the API gateway 116 may invoke the interaction indicated in the API with the service 108 by sending the interaction indicated in the API call to the service-logic component 134. The service-logic component 134 may be configured to perform the interaction at 318 according to logic for that service 108. At 320, the service-logic component 134 may return an indication of a result for the interaction on the service 108 to the API gateway 116, and the API gateway 116 may return the result 322 to the client device 104 to notify the user 106 of the result of the API call.

Figure 4:
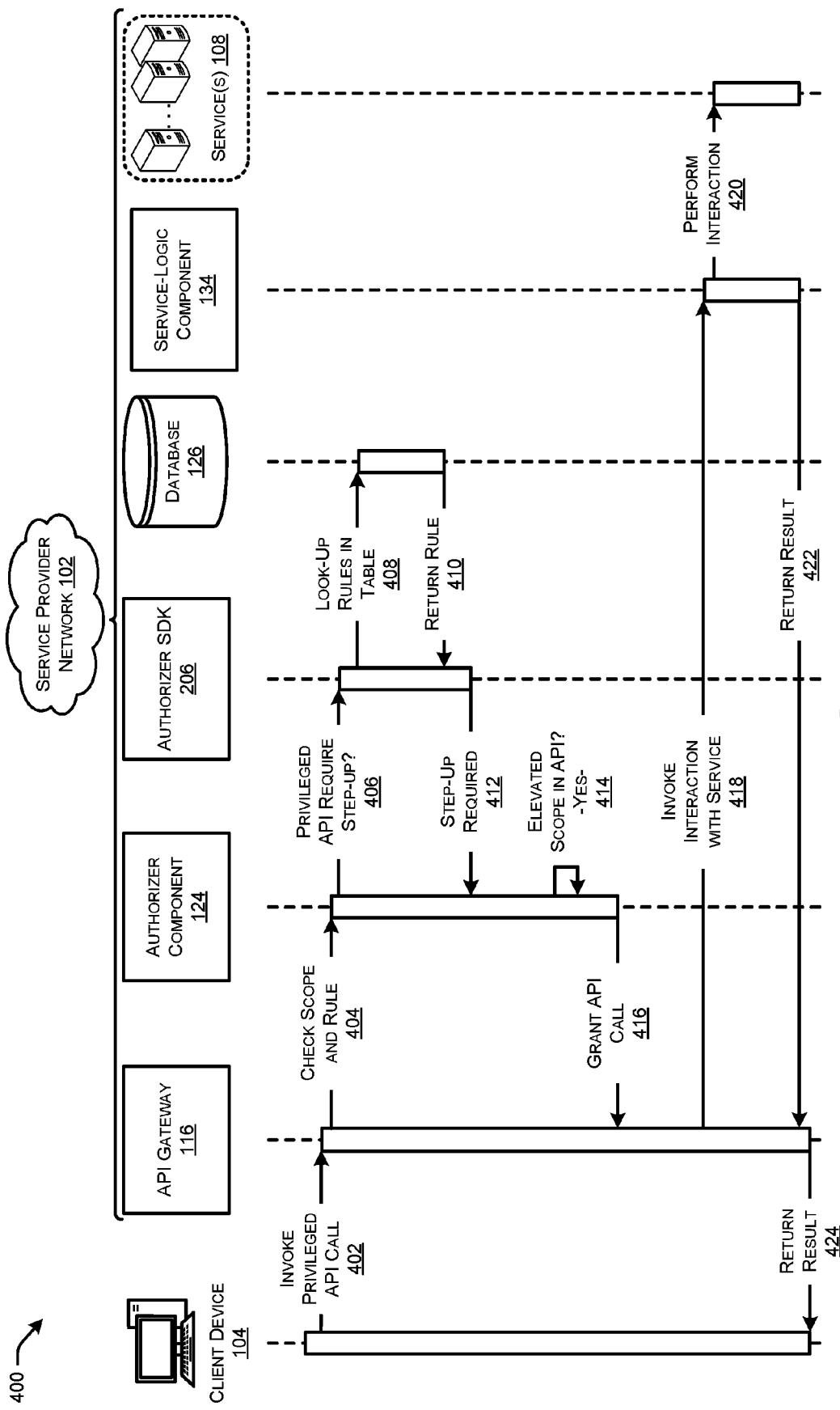
FIG. 4 illustrates a sequence diagram illustrating an example flow of interactions arranged in a time sequence for an API gateway and authorizer component of a service provider network to determine that an API call from a client device does require elevated access scope, but that the client device already has a JSON web token with the required elevated scope.

FIG. 4 illustrates a sequence diagram 400 illustrating an example flow of interactions arranged in a time sequence for an API gateway 116 and authorizer component 124 of a service provider network 102 to determine that an API call from a client device 104 does require elevated access scope, but that the client device 104 already has a JSON web token with the required elevated scope.

At 402, the client device 102 may invoke a privileged API call by sending the privileged API call to the API gateway 116. At 404, the API gateway 116 may send a request to the authorizer component 124 to check the scope and rule for the privileged API call. The authorizer component 124 may receive the request, and at 406, cause the authorizer SDK 206 to determine whether the privileged API requires a step-up authentication.

At 408, the authorizer SDK 206 may perform a look-up in the privileged API call table 202 to identify a rule 210 associated with the privileged API call. The database 126 may receive the query, and at 410, return a rule 210 to the authorizer SDK 206 that is mapped to the privileged API call. The authorizer SDK 206 may determine, at 412, that step-up is required in examples where the payload of the API call qualifies as privileged according to the rule 210 for the API call.

At 414, the authorizer component 124 may receive the indication that step-up authentication is required, and determine that there is elevated access scope in the token of the API call. As there is elevated access scope in the token of the API call, the authorizer component 124 may grant the API call at 416.

At 418, the API gateway 116 may invoke the interaction indicated in the API with the service 108 by sending the interaction indicated in the API call to the service-logic component 134. The service-logic component 134 may be configured to perform the interaction at 420 according to logic for that service 108. At 422, the service-logic component 134 may return an indication of a result for the interaction on the service 108 to the API gateway 116, and the API gateway 116 may return the result 424 to the client device 104 to notify the user 106 of the result of the API call.

Figure 5:
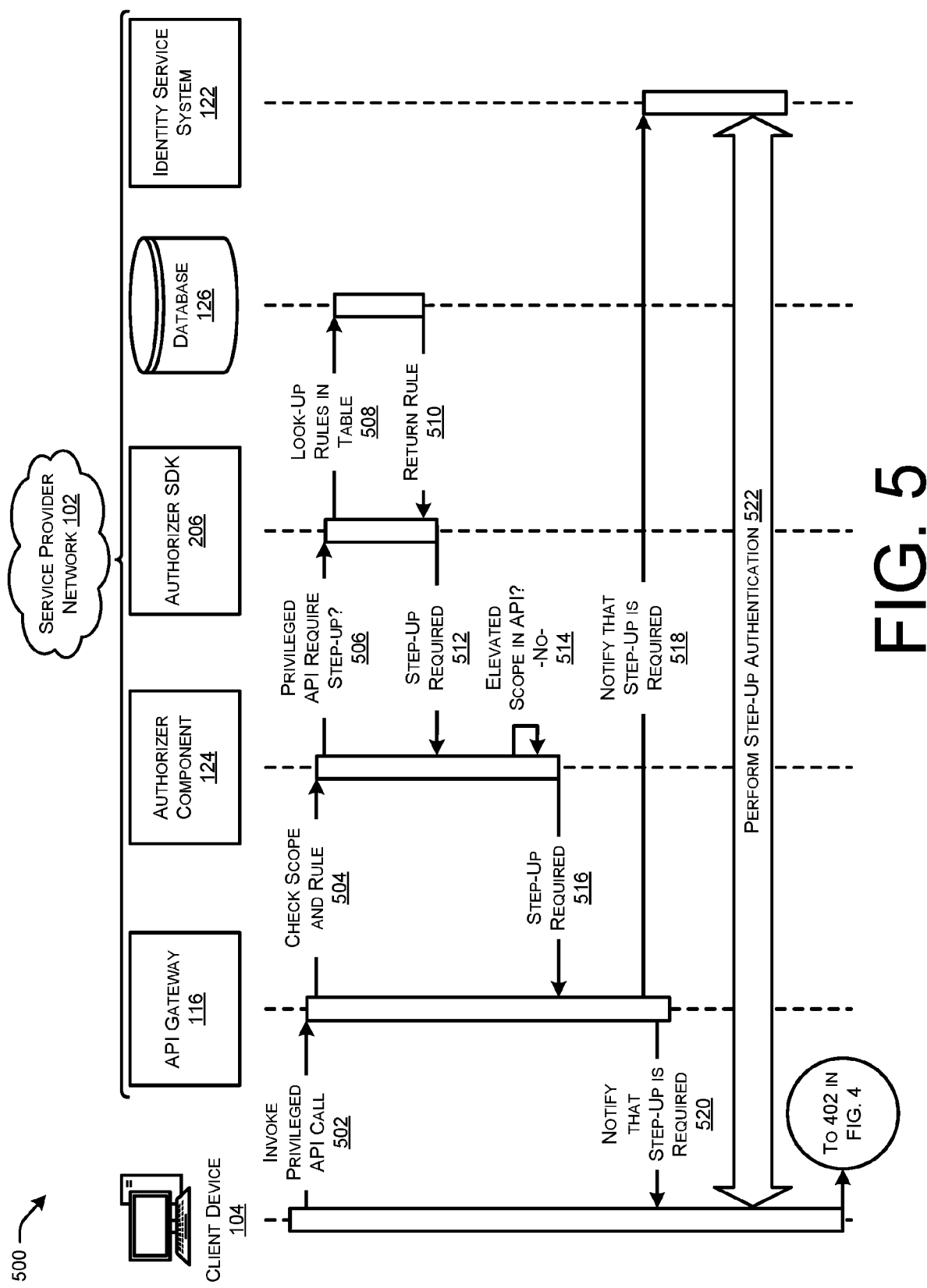
FIG. 5 illustrates a sequence diagram illustrating an example flow of interactions arranged in a time sequence for an API gateway and authorizer component of a service provider network to determine that an API call from a client device does require elevated access scope, and that the client device does not have a JSON web token with the required elevated scope. The client device then performs a step-up authentication process with an identity service provider to obtain a JSON web token with the elevated access scope to perform the API call.

FIG. 5 illustrates a sequence diagram 500 illustrating an example flow of interactions arranged in a time sequence for an API gateway 116 and authorizer component 124 of a service provider network 102 to determine that an API call from a client device does require elevated access scope, and that the client device 104 does not have a JSON web token with the required elevated scope. The client device 104 then performs a step-up authentication process with an identity service provider to obtain a JSON web token with the elevated access scope to perform the API call.

At 502, the client device 102 may invoke a privileged API call by sending the privileged API call to the API gateway 116. At 504, the API gateway 116 may send a request to the authorizer component 124 to check the scope and rule for the privileged API call. The authorizer component 124 may receive the request, and at 506, cause the authorizer SDK 206 to determine whether the privileged API requires a step-up authentication.

At 508, the authorizer SDK 206 may perform a look-up in the privileged API call table 202 to identify a rule 210 associated with the privileged API call. The database 126 may receive the query, and at 510, return a rule 210 to the authorizer SDK 206 that is mapped to the privileged API call. The authorizer SDK 206 may determine, at 512, that step-up is required in examples where the payload of the API call qualifies as privileged according to the rule 210 for the API call.

At 514, the authorizer component 124 may receive the indication that step-up authentication is required, and determine that there is not elevated access scope in the token of the API call. Because there is not elevated access scope in the token of the API call, the authorizer component 124 may, at 516, notify the API gateway 116 that step-up authentication is required. At 518, the API gateway 116 may notify the identity service system 112 that step-up is required, and also indicate what token and/or access scope is required to help determine an authentication protocol and/or a number of authentication protocols to use. Similarly, the API gateway 116 may notify the client device 104 that step-up is required 520.

At 522, the client device 104 may perform one or more step-up authentication protocols with the identity service system 122 in order to obtain one or more tokens with access scope that permits invocation of the privileged API call. After obtaining the token(s), the client device 104 proceed to step 402 in FIG. 4.

FIGS. 6A, 6B, 7, and 8 illustrate flow diagrams of example methods 600, 700, and 800 that illustrate aspects of the functions performed at least partly by the service provider network 102 as described in FIGS. 1-5. The logical operations described herein with respect to FIGS. 6A, 6B, 7, and 8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6A, 6B, 7, and 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some examples, the techniques of methods 600, 700, and 800 may be performed by a system comprising one or more processors and one or more computer-readable media storing computer-executable instructions that, when executed by the one or more processors, cause the one or more processors to perform the operations of the methods.

Figure 6A:
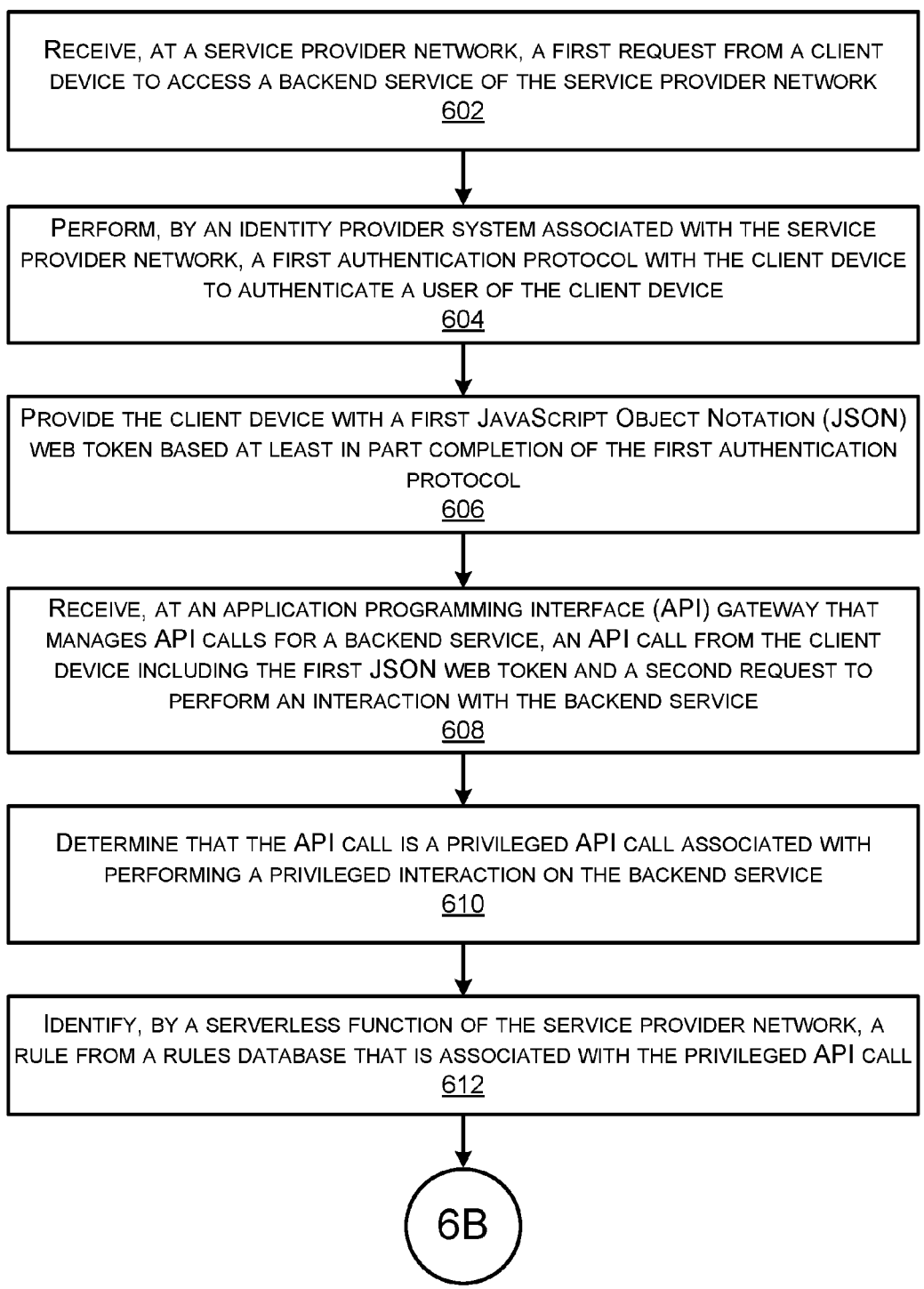
FIGS. 6A and 6B collectively illustrate a flow diagram of an example method performed by a service provider network for performing adaptive step-up authentication techniques for a privileged API call. The flow diagram includes an identity provider service performing a first authentication protocol to provide a client device with a first JSON web token, a serverless function working in conjunction with an API gateway to determine that a privileged API call is outside a first access scope of the first JSON web token, and the client device performing a second authentication protocol with the identity service provider to obtain a second JSON web token with the required access scope for the API call.
Figure 6B:
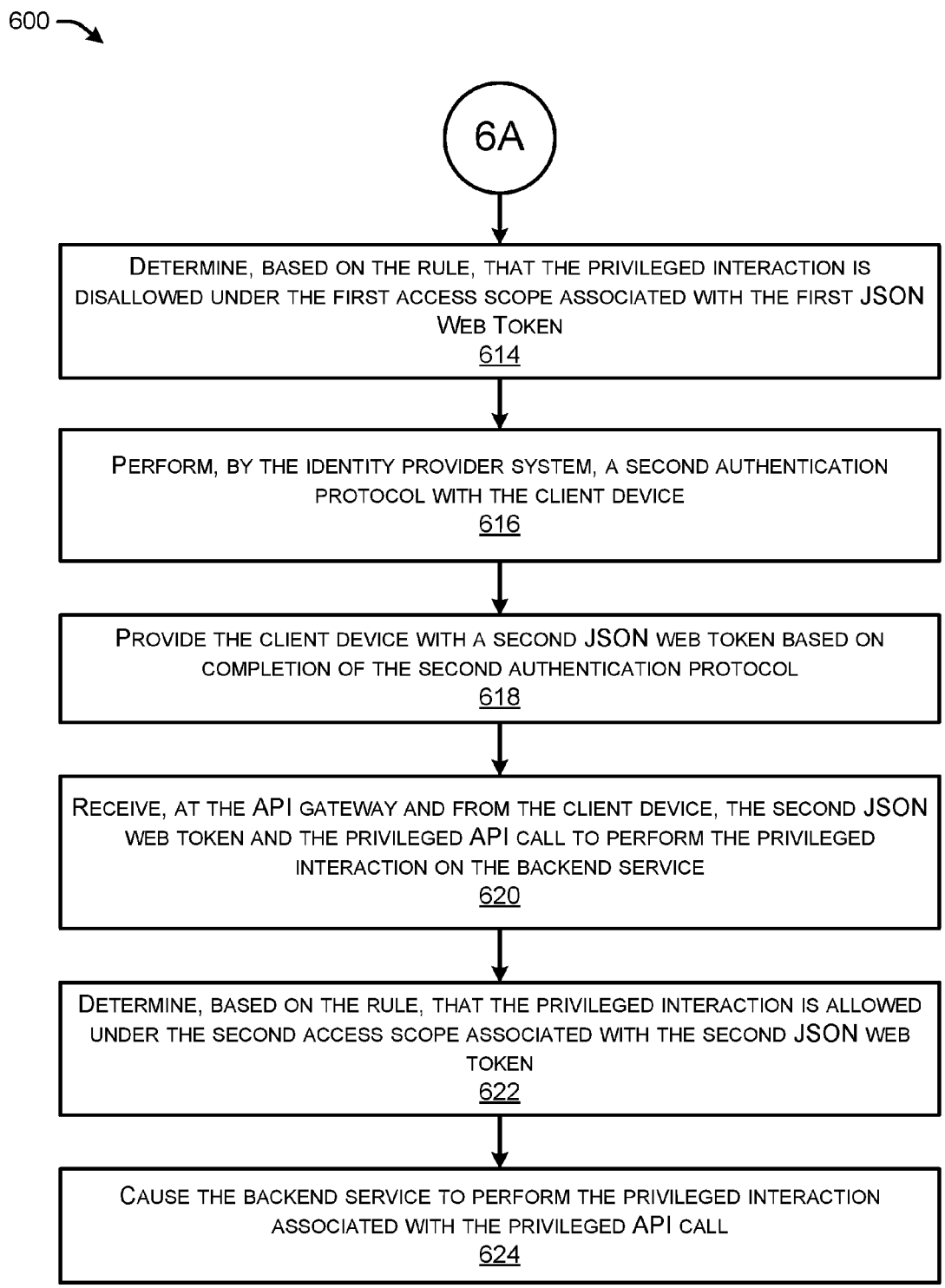

FIGS. 6A and 6B collectively illustrate a flow diagram of an example method 600 performed by a service provider network 102 for performing adaptive step-up authentication techniques for a privileged API call. The flow diagram includes an identity provider service performing a first authentication protocol to provide a client device 104 with a first JSON web token, a serverless function working in conjunction with an API gateway 118 to determine that a privileged API call is outside a first access scope of the first JSON web token, and the client device 104 performing a second authentication protocol with the identity service provider to obtain a second JSON web token with the required access scope for the API call.

At 602, a service provider network may receive a first request from a client device to access a backend service of the service provider network. For instance, the service provider network 102 may receive a request from the client device 104 to log in for use of the service 108 of the service provider network 108.

At 604, an identity provider system associated with the service provider network may perform a first authentication protocol with the client device to authenticate a user of the client device. For instance, the identity service system 122 may perform a first authentication protocol, such as a protocol that includes use of a username and password to obtain credentials, to authenticate the user 106 of the client device 104. While the identity service system 122 may be a part of the service provider network 102 in some examples, the identity service system 122 may also be a separate entity as well in some examples.

At 606, the identity service system 122 may provide the client device 104 with a first JavaScript Object Notation (JSON) web token based at least in part completion of the first authentication protocol. The first JSON web token may be associated with a first access scope according to which the user 106 of the client device 104 interacts with the backend service.

At 608, a stateless application programming interface (API) gateway that manages API calls for the backend service of the service provider network may receive an API call from the client device including the first JSON web token and a second request to interact with the backend service. For instance, the local agent 114 may determine that input from the user 106 indicates that the user 106 would like to perform an interaction on the service 108, and the local agent 114 may send an API call to the API gateway 118 that includes the first JSON web token. Generally, the stateless API gateway 118 may be stateless in that different endpoints may be able to answer API calls from a same client device 104 without having to maintain state. For instance, the stateless API gateway 118 may include multiple endpoints that can service API calls for client devices 104 using JSON tokes, for instance.

At 610, at least one of the API gateway or the authorizer component may determine that the API call is a privileged API call associated with performing a privileged interaction on the backend service. For instance, it may be determined that a type of the API call and/or a payload of the API call indicates that the API call is a privileged API call.

At 612, a pluggable authorization of the service provider network may identify a rule from a rules database that is associated with the privileged API call. For instance, the pluggable authorizer component 126 may query the database 128 to identify a rule 130 that is mapped to, or associated with, a name of the API call.

At 614, the pluggable authorizer component 126 may determine, based at least in part on the rule, that the privileged interaction is disallowed under the first access scope associated with the first JSON web token. For instance, the service provider network 102 (and any components therein) may determine that the rule 130 is mapped to permissible access scopes that are elevated relative to the first access scope, and/or that the first access scope is not mapped to the rule 130.

At 616, the identity provider system may perform a second authentication protocol with the client device 104. At 618, the identity provider system may provide the client device 104 with a second JSON web token based at least in part completion of the second authentication protocol. The second JSON web token may be associated with a second access scope for the client device to perform the privileged interaction with the backend service using the privileged API call.

At 620, the API gateway may receive, from the client device, the second JSON web token and the privileged API call to perform the privileged interaction on the backend service 108. For instance, the privileged API call may include an API key to is the second JSON web token.

At 622, the service provider network 102 may determine, based at least in part on the rule, that the privileged interaction is allowed under the second access scope associated with the second JSON we token. At 624, the service provider network may cause the backend service to perform the privileged interaction associated with the privileged API call.

Figure 7:
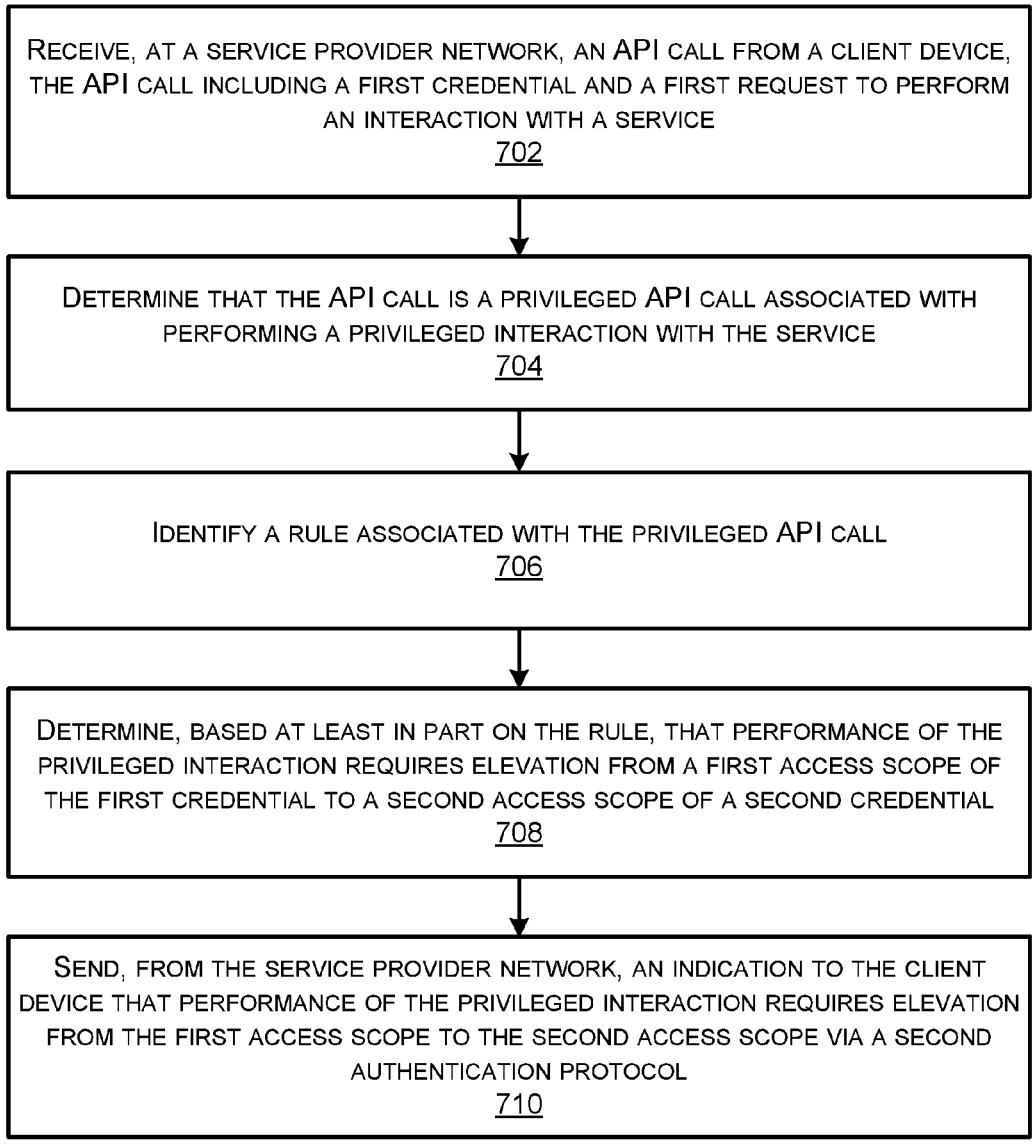
FIG. 7 illustrates a flow diagram of an example method performed by a service provider network for determining that a client device needs to perform a step-up authentication based on an API call from the client device being outside an access scope of a JSON web token sent from the client device.

FIG. 7 illustrates a flow diagram of an example method 700 performed by a service provider network 102 for determining that a client device 104 needs to perform a step-up authentication based on an API call from the client device 104 being outside an access scope of a JSON web token sent from the client device 104.

At 702, a stateless API gateway of the service provider network 102 may receive an application programming interface (API) call from a client device 104. The API call may include a first credential (e.g., token) obtained via a first authentication protocol and associated with a first access scope for interacting with a service of the service provider network 102, and a first request to interact with the service 108.

At 704, the service provider network 102 may determine that the API call is a privileged API call associated with performing a privileged interaction with the service. For instance, the authorizer component 126 may determine that a rule 130 associated with the API call indicates that a payload of the API call is associated with a privileged call.

At 706, a pluggable authorizer component 126 of the service provider may identify a rule associated with the privileged API call. For instance, the authorizer component 126 may query the database 128 to identify a rule 130 associated with, or mapped to, a name of the privileged API call.

At 708, the pluggable authorizer component 126 of the service provider network 102 may determine, based at least in part on the rule, that performance of the privileged interaction requires elevation from the first access scope of the first credential to a second access scope of a second credential. At 710, the service provider network may send an indication to the client device that performance of the privileged interaction requires elevation from the first access scope to the second access scope via a second authentication protocol.

Figure 8:
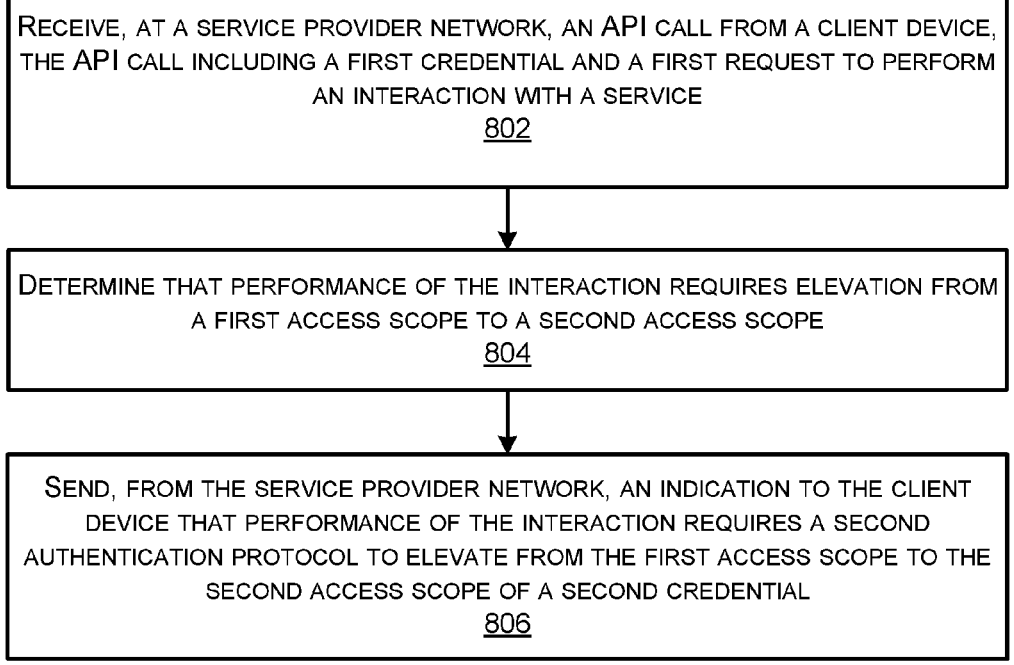
FIG. 8 illustrates a flow diagram of an example method performed by a service provider network for determining that a client device needs to perform a step-up authentication to invoke an API call.

FIG. 8 illustrates a flow diagram of an example method 800 performed by a service provider network 102 for determining that a client device 104 needs to perform a step-up authentication to invoke an API call.

At 802, at a stateless API gateway of a service provider network 102 may receive an application programming interface (API) call from a client device 104. In some examples, the API call may include a first credential obtained via a first authentication protocol and associated with a first access scope for interacting with a service of the service provider network, and a first request to perform an interaction with the service 108.

At 804, a pluggable authorizer component of the service provider network 102 may determine that performance of the interaction requires elevation from the first access scope to a second access scope.

In some instances, prior to receiving the API call, the service provider network 102 may store first metadata associated with the client device 104, such as a geolocation, a web browser, and/or other data indicating characteristics of the client device 104. The service provider network 102 may further determine, based at least in part on the first metadata, a digital fingerprint associated with the client device 104. Additionally, the service provider network 102 may identify, from the API call, second metadata associated with the client device 104. Further, the service provider network 102 may detect, at least partly using the second metadata, a change in the digital fingerprint. For instance, the client device 104 may have begun using a different browser, a different client device 104, etc. In such examples, determining that performance of the privileged interaction requires elevation from the first access scope to the second access scope is based at least in part on detecting the change in the digital fingerprint.

At 806, the service provider network may send an indication to the client device 104 that performance of the interaction requires a second authentication protocol to elevate from the first access scope to the second access scope of a second credential.

As described in this application, the authorizer component 126 may be a pluggable component in that the authorizer component 126 is capable of being inserted into any service provider network 102 and work in conjunction with any type of API gateway 118. In some examples, the API gateway 118 may communicate with the service-logic component 134 using a protocol that the service-logic component 134 (e.g., container, serverless function, workload, etc.) implements. The protocol used between the API gateway 118 and the service-logic component 134 may be specific to different types of API gateways 118 in different service provider networks 102. As part of that protocol, the payload from the API call may go through a data stream called an event, and in addition to the payload, the API gateway 118 may modify the context pass additional information such as user identification information, policy decisions, and so forth. The pluggable authorizer component 126 may receive the modified context and use the context to determine whether step-up authentication is required. That is, additional metadata around the payload of the API may be included as modified context for the pluggable authorizer component 126, and the additional metadata may include who the user is, who is calling, an Identity and Access Management (IAM) policy, etc. Further, the pluggable authorizer component 126 may use the metadata to determine whether to step-up authorization without modifying the logic of the service-logic component 134. The pluggable authorizer component 126 may use the additional metadata to determine the context around the API call and determine whether step-up authentication is required.

Figure 9:
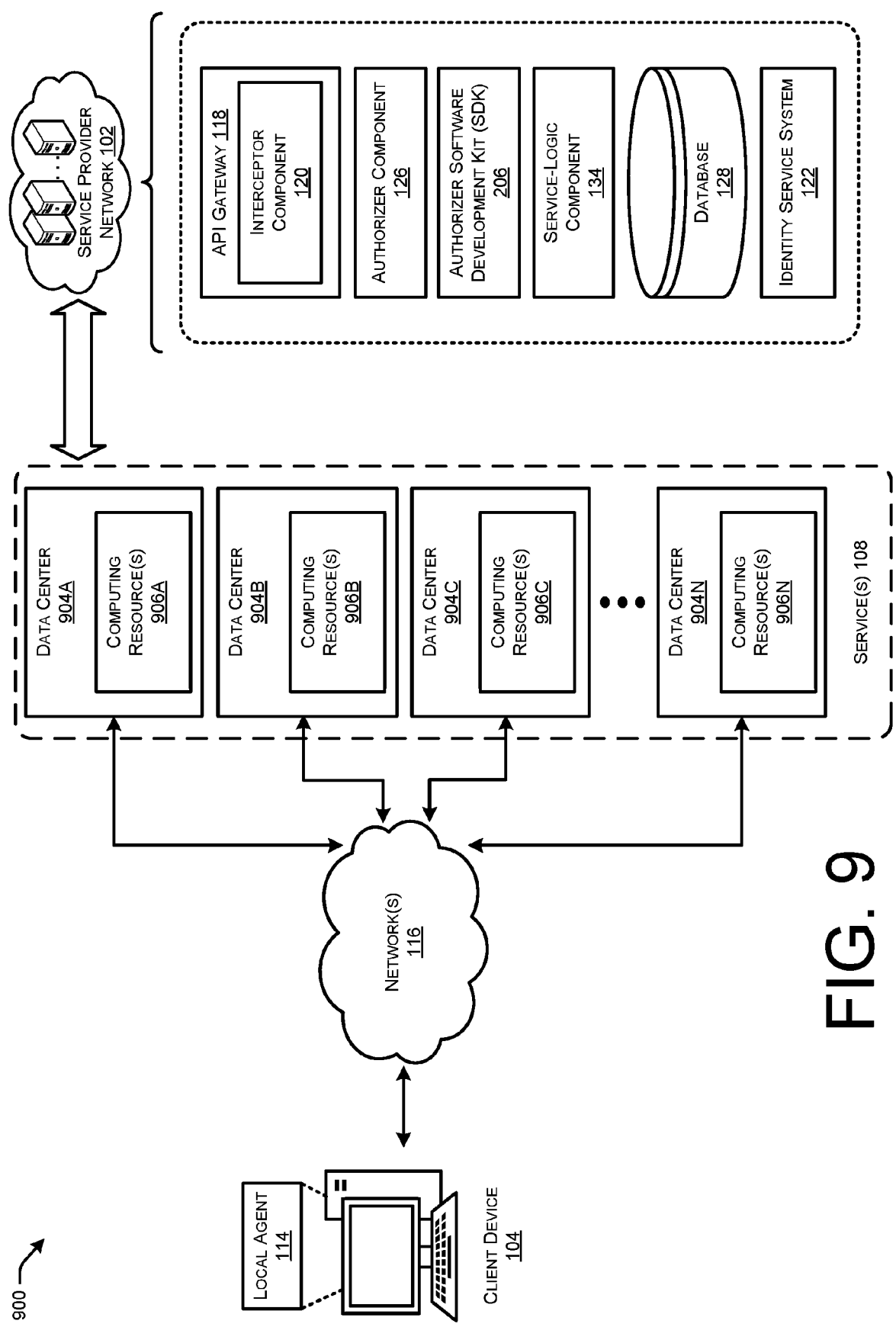
FIG. 9 illustrates a system and network diagram that shows an illustrative operating environment that includes a service provider network that can be configured to implement aspects of the functionality described herein.

FIG. 9 illustrates a system and network diagram 900 that shows an illustrative operating environment that includes a service provider network 102 (that may be part of or associated with a cloud-based service network/platform) that can be configured to implement aspects of the functionality described herein.

The service provider network 102 can provide computing resources 906, like VM instances, containers, serverless functions, storage, etc., on a permanent or an as-needed basis. Among other types of functionality, the computing resources 906 provided by the service provider network 102 may be utilized to implement the various cloud-based services. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources 906 provided by the service provider network 102 may be enabled in one embodiment by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations. One illustrative embodiment for a data center 904 that can be utilized to implement the technologies disclosed herein will be described below with regard to FIG. 10.

The data centers 904 may be configured in different arrangements depending on the service provider network 102. For example, one or more data centers 904 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The users and/or admins of the service provider network 102 may access the computing resources 906 provided by the data centers 904 of the service provider network 102 over any wired and/or wireless network(s) 116 (utilizing a client device 104 and/or another accessing-user device), which can be a wide area communication network ("WAN"), such as the Internet, an intranet or an Internet service provider ("ISP") network or a combination of such networks. For example, and without limitation, a device operated by aa user of the service provider network 102 may be utilized to access the service provider network 102 by way of the network(s) 116. It should be appreciated that a local-area network ("LAN"), the Internet, or any other networking topology known in the art that connects the data centers 904 to remote clients and other users can be utilized. It should also be appreciated that combinations of such networks can also be utilized.

In a distributed computing environment, such as the one included in the service provider network 102 (e.g., computing-resource network), a fleet of VM instances and/or servers may have workflow or processes executed thereon to manage resources. For instance, a patch may need to be installed on each VM instance and/or resource at a particular time. In such distributed applications of workflows or processes, a load balancer may be at the front end in front of the fleet of servers where a request for a workflow comes in, and the load balancer distributes the request to execute the workflow amongst the servers.

Figure 10:
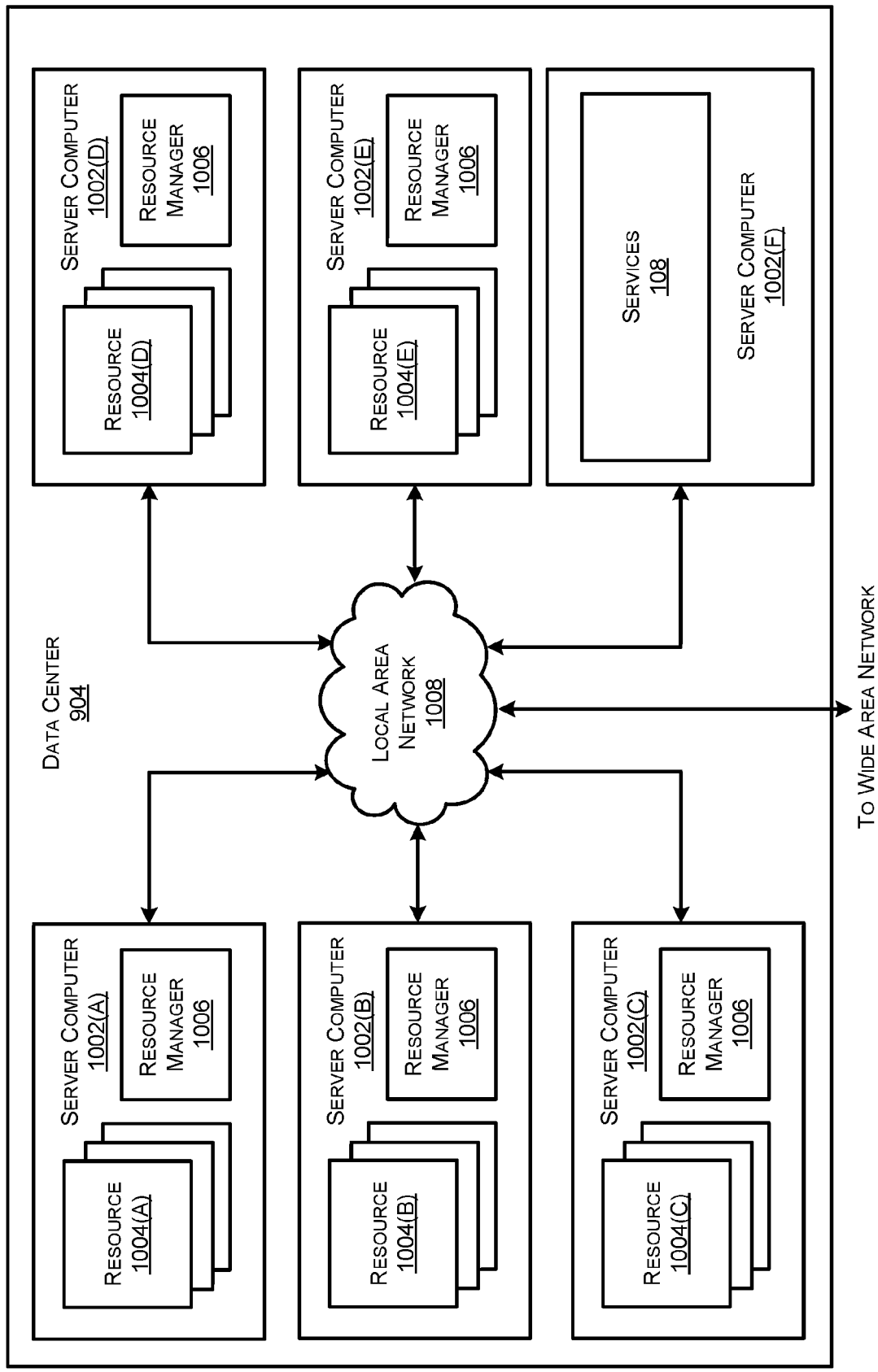
FIG. 10 illustrates a computing system diagram illustrating a configuration for a data center that can be utilized to implement aspects of the technologies disclosed herein.

FIG. 10 is a computing system diagram that illustrates one configuration for a data center 904 that implements aspects of the technologies disclosed herein. The example data center 904 shown in FIG. 10 includes several server computers 1002A-1002F (which might be referred to herein singularly as "a server computer 1002" or in the plural as "the server computers 1002") for providing computing resources 1004A-1004E. In some examples, the resources 1004 may include, or correspond to, the computing resources 112 described herein (e.g., virtual machines executing on the server computers).

The server computers 1002 can be standard tower, rack-mount, or blade server computers configured appropriately for providing the computing resources described herein (illustrated in FIG. 10 as the computing resources 1004A-1004E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 904 can also be configured to provide network services and other types of services, some of which are described in detail below with regard to FIG. 11.

The data center 904 shown in FIG. 10 also includes a server computer 1002F that can execute some or all of the software components described above. For example, and without limitation, the server computer 1002F can be configured to execute components of the service provider network 102, including the services 108.

In the example data center 904 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 904A-904N, between each of the server computers 1002A-1002F in each data center 904, and, potentially, between computing resources in each of the server computers 1002. It should be appreciated that the configuration of the data center 904 described with reference to FIG. 10 is merely illustrative and that other implementations can be utilized.

Figure 11:
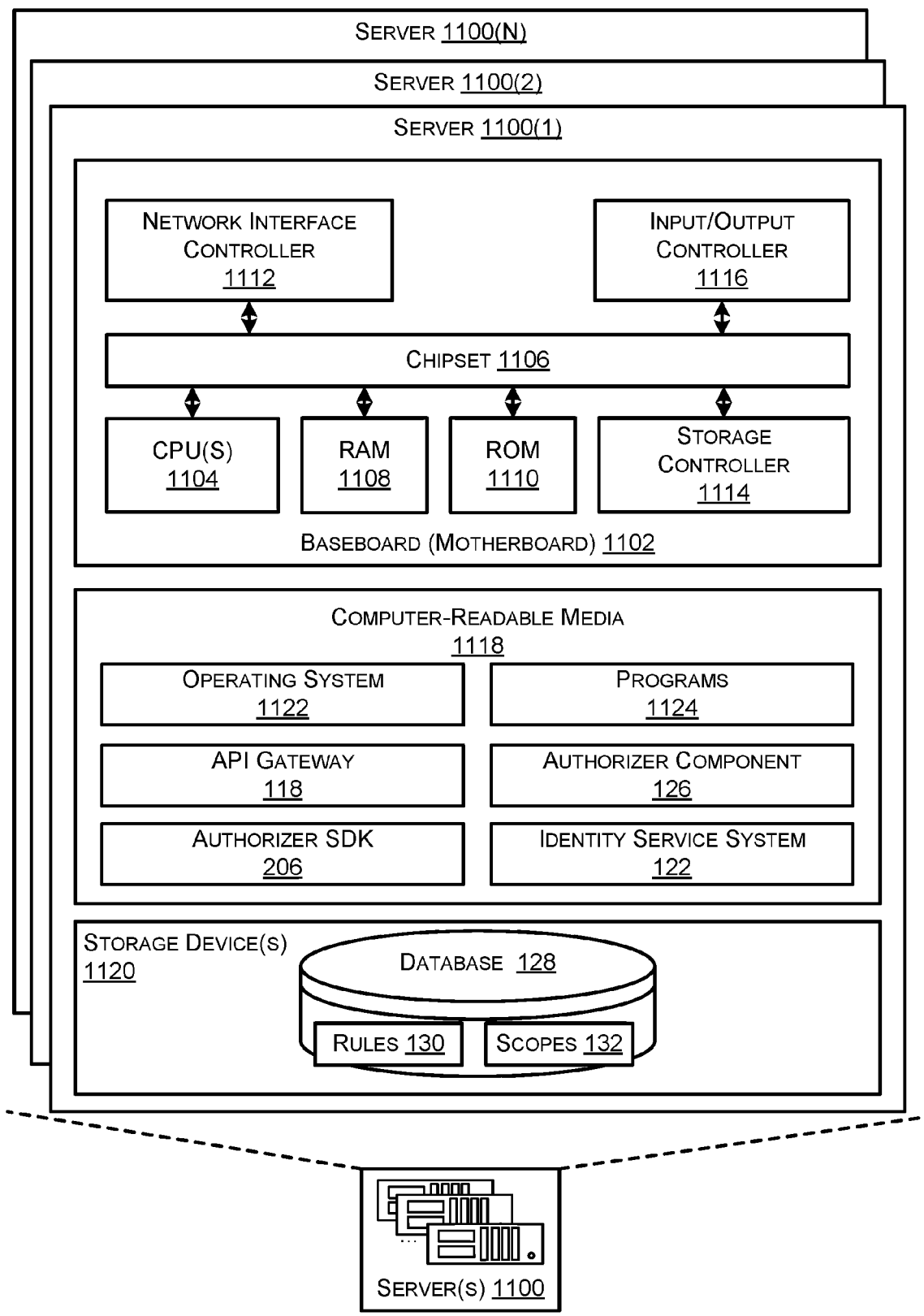
FIG. 11 is a computer architecture diagram showing an illustrative computer hardware architecture for implementing a computing device that can be utilized to implement aspects of the various technologies presented herein.

FIG. 11 is a computer architecture diagram showing illustrative hardware and software architecture for implementing one or more server devices 1100 that can be utilized to implement aspects of the various technologies presented herein. The computer architecture shown in FIG. 11 illustrates a conventional server computer, workstation, desktop computer, laptop, tablet, network appliance, e-reader, smartphone, or other computing device, and can be utilized to execute any of the software components presented herein.

The server 1100 includes a baseboard 1112, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the server 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1112. The chipset 1106 can provide an interface to a RAM 1108, used as the main memory in the server 1100. The chipset 1106 can further provide an interface to a computer-readable storage medium such as a read-only memory ("ROM") 1110 or non-volatile RAM ("NVRAM") for storing basic routines that help to startup the server 1100 and to transfer information between the various components and devices. The ROM 1110 or NVRAM can also store other software components necessary for the operation of the server 1100 in accordance with the configurations described herein.

The server 1100 can operate in a networked environment using logical connections to remote computing devices and computer systems through a network, such as the network 1108. The chipset 1106 can include functionality for providing network connectivity through a NIC 1112, such as a gigabit Ethernet adapter. The NIC 1112 is capable of connecting the servers 1100 to other computing devices over the network 1108 (or 118). It should be appreciated that multiple NICs 1112 can be present in the server 1100, connecting the computer to other types of networks and remote computer systems.

The server 1100 can be connected to one or more computer-readable media 1118 storing software components for the server devices 1100, and one or more mass storage devices 1120 for storing data. The computer-readable media 1118 can store an operating system 1122, programs 1124, and data, which have been described in greater detail herein. The mass storage device 1120 can be connected to the server 1100 through a storage controller 1114 connected to the chipset 1106. The mass storage device 1120 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable media 1118 may store the components described herein as executable, computer-readable instructions. For instance, the components may include the API gateway 118, the authorizer component 126, the authorizer SDK, and/or the identity services system 122. The components may be stored and/or executed on a single server, or on a system of two or more severs 1100.

The server 1100 can store data on the mass storage device 1120 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1120 is characterized as primary or secondary storage, and the like.

For example, the server 1100 can store information to the mass storage device 1120 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server 1100 can further read information from the mass storage device 1120 by detecting the physical states or characteristics of one or more particular locations within the physical storage units.

In addition to the mass storage device 1120 described above, the server 1100 can have access to the computer-readable storage media 1118 to store and retrieve information, such as program modules, data structures, or other data. It should be appreciated by those skilled in the art that computer-readable storage media is any available media that provides for the non-transitory storage of data and that can be accessed by the server 1100. In some examples, the operations performed by the service provider network 102, and or any components included therein, may be supported by one or more devices similar to server 1100. Stated otherwise, some or all of the operations performed by the service provider network 102, and or any components included therein, may be performed by one or more computer devices 1100 operating in a cloud-based arrangement. As shown, the storage device 1120 may store the database 128 that includes the rules 130, scopes 132, and access policies.

By way of example, and not limitation, computer-readable storage media 1118 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1120 can store an operating system 1122 utilized to control the operation of the server 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 1120 can store other system or application programs and data utilized by the server 1100.

In one embodiment, the mass storage device 1120 or other computer-readable storage media 1118 is encoded with computer-executable instructions which, when loaded into the server 1100, transform the computer from a general-purpose computing system into a special-purpose computer capable of implementing the embodiments described herein. These computer-executable instructions transform the server 1100 by specifying how the CPUs 1104 transition between states, as described above. According to one embodiment, the server 1100 has access to computer-readable storage media storing computer-executable instructions which, when executed by the server 1100, perform the various processes described above with regard to FIGS. 1-10. The server 1100 can also include computer-readable storage media having instructions stored thereupon for performing any of the other computer-implemented operations described herein.

The server 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the server 1100 might not include all of the components shown in FIG. 11, can include other components that are not explicitly shown in FIG. 11, or might utilize an architecture completely different than that shown in FIG. 11.

In various examples, the service provider network may be part of or associated with a cloud-based service network that can be configured to implement aspects of the functionality described herein.

The service provider network 102 can provide computing resources 112, like physical servers, VM instances, containers, serverless functions, network functions, and storage, on a permanent or an as-needed basis. Among other types of functionality, the computing resources 112 provided by the service provider network 102 may be utilized to implement the various services described above. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources 112 provided by the service provider network 102 may be enabled in one embodiment by one or more data centers 110 (which might be referred to herein singularly as "a data center 110" or in the plural as "the data centers 110"). The data centers 110 are facilities utilized to house and operate computer systems and associated components. The data centers 110 typically include redundant and backup power, communications, cooling, and security systems. The data centers 110 can also be located in geographically disparate locations.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to perform operations comprising:
receiving, at a service provider network, a first request from a client device to access a backend service of the service provider network;
performing, by an identity provider system associated with the service provider network, a first authentication protocol with the client device to authenticate a user of the client device;
providing the client device with a first JavaScript Object Notation (JSON) web token based on completion of the first authentication protocol, the first JSON web token being associated with a first access scope according to which the user of the client device interacts with the backend service;
receiving, at a stateless application programming interface (API) gateway that manages API calls for the backend service of the service provider network, an API call from the client device including the first JSON web token and a second request to interact with the backend service;
determining that the API call is a privileged API call associated with performing a privileged interaction on the backend service;
identifying, by a pluggable authorizer component of the service provider network, a rule from a rules database that is associated with the privileged API call;
determining, by the pluggable authorizer component and based on the rule, that the privileged interaction is disallowed under the first access scope associated with the first JSON web token;
performing, by the identity provider system, a second authentication protocol with the client device; and
providing the client device with a second JSON web token based on completion of the second authentication protocol, the second JSON web token being associated with a second access scope for the client device to perform the privileged interaction with the backend service using the privileged API call.

2. The system of claim 1, the operations further comprising:
receiving, at the stateless API gateway and from the client device, the second JSON web token and the privileged API call to perform the privileged interaction on the backend service;
determining, based on the rule, that the privileged interaction is allowed under the second access scope associated with the second JSON web token; and
causing the backend service to perform the privileged interaction associated with the privileged API call.

3. The system of claim 1, the operations further comprising:
determining, by the pluggable authorizer component, a type of the stateless API gateway;
determining, based on the type of the stateless API gateway, a context according to which to communicate with the stateless API gateway;
generating, by the pluggable authorizer component and according to the context, an indication that the client device is to perform the second authentication protocol to obtain the second JSON web token; and
sending the indication to the stateless API gateway.

4. The system of claim 1, the operations further comprising, prior to performing the second authentication protocol:
determining that the privileged interaction is allowed under the second access scope associated with the second JSON web token; and
selecting, from a plurality of JSON web tokens, the second JSON web token to be provided to the client device based at least in part on the privileged interaction being allowed under the second access scope associated with the second JSON web token.

5. A computer-implemented method comprising:
receiving, at a stateless application programming interface (API) gateway of a service provider network, an API call from a client device, the API call including:
a first credential obtained via a first authentication protocol and associated with a first access scope for interacting with a service of the service provider network; and
a first request to interact with the service;
determining that the API call is a privileged API call associated with performing a privileged interaction with the service;
identifying, by a pluggable authorizer component, a rule associated with the privileged API call;
determining, by the pluggable authorizer component and based at least in part on the rule, that performance of the privileged interaction requires elevation from the first access scope of the first credential to a second access scope of a second credential; and
sending, from the service provider network, an indication to the client device that performance of the privileged interaction requires elevation from the first access scope to the second access scope via a second authentication protocol.

6. The computer-implemented method of claim 5, further comprising:
performing, by an identity provider system associated with the service provider network, the first authentication protocol with the client device;
providing the client device with the first credential based at least in part on completion of the first authentication protocol;
subsequent to providing the indication to the client device that performance of the privileged interaction requires elevation to the second access scope:
performing, by the identity provider system, the second authentication protocol with the client device; and
providing the client device with the second credential based at least in part on completion of the second authentication protocol.

7. The computer-implemented method of claim 5, further comprising:
receiving, from the client device, the privileged API call including the second credential;
determining, based at least in part on the rule, that the privileged interaction is allowed under the second access scope of the second credential; and
causing the service to perform the privileged interaction associated with the privileged API call.

8. The computer-implemented method of claim 5, further comprising:
determining, by the pluggable authorizer component of the service provider network, a type of an API gateway of the service provider network;
determining, based at least in part on the type of the stateless API gateway, a context according to which to communicate with the stateless API gateway;
generating, by the pluggable authorizer component and according to the context, a notification that the client device is to perform the second authentication protocol to obtain the second credential; and
sending the notification to the API stateless gateway.

9. The computer-implemented method of claim 5, further comprising:

receiving first input data indicating rules for a plurality of API calls for interacting with the service, individual ones of the rules defining respective payloads for the API calls that indicative privileged API calls to perform privileged interactions with the service;
receiving second input data indicating access scopes required for performance of the privileged interactions of the privileged API calls;
storing, in one or more databases, first associations between individual ones of the rules and respective ones of the API calls; and
storing, in the one or more databases, second associations between individual ones of the access scopes and respective ones of the rules that define the respective payloads that indicate privileged API calls,
wherein:
identifying the rule comprises querying the one or more databases using the API call; and
determining that performance of the privilege interaction requires elevation from the first access scope to the second access scope comprises identifying, from the second associations, that the second access scope is associated with the privileged API call.

10. The computer-implemented method of claim 5, wherein the first credential comprises a JavaScript (JSON) web token that is associated with the first access scope.

11. The computer-implemented method of claim 5, further comprising:
storing, prior to receiving the API call, first metadata associated with the client device;
determining, based at least in part on the first metadata, a digital fingerprint associated with the client device;
receiving, subsequent to receiving the API call, second metadata associated with the client device; and
detecting, at least partly using the second metadata, a change in the digital fingerprint,
wherein determining that performance of the privileged interaction requires elevation from the first access scope to the second access scope is further based at least in part on detecting the change in the digital fingerprint.

12. The method of claim 5, further comprising, prior to performing the second authentication protocol:
determining that the privileged interaction is allowed under the second access scope associated with the second credential; and
selecting, from a plurality of credentials, the second credential to be sent to the client device based at least in part on the privileged interaction being allowed under the second access scope associated with the second credential.

13. A system comprising:
one or more processors; and
one or more non-transitory computer-readable media storing computer-executable instructions that, when executed by the one or more processors, cause the one or more processors to perform operations comprising:
receiving, at a stateless application programming interface (API) gateway of a service provider network, an API call from a client device, the API call including:
a first credential obtained via a first authentication protocol and associated with a first access scope for interacting with a service of the service provider network; and
a first request to perform an interaction with the service;
determining, by a pluggable authorizer component of the service provider network, that performance of the interaction requires elevation from the first access scope to a second access scope; and sending, from the service provider network, an indication to the client device that performance of the interaction requires a second authentication protocol to elevate from the first access scope to the second access scope of a second credential.

14. The system of claim 13, the operations further comprising:

determining that the API call is a privileged API call associated with performing a privileged interaction with the service, wherein determining that performance of the privileged interaction requires elevation from the first access scope of the first credential to a second access scope of a second credential is based at least in part on the API call being a privileged API call.

15. The system of claim 14, the operations further comprising:

identifying a rule associated with the privileged API call, wherein determining that performance of the privileged interaction requires elevation from the first access scope of the first credential to a second access scope of a second credential is based at least in part on the rule.

16. The system of claim 13, the operations further comprising:

storing, prior to receiving the API call, first metadata associated with the client device;

determining, based at least in part on the first metadata, a digital fingerprint associated with the client device;

identifying, from the API call, second metadata associated with the client device; and detecting, at least partly using the second metadata, a change in the digital fingerprint, wherein determining that performance of the interaction requires elevation from the first access scope to the second access scope is based at least in part on detecting the change in the digital fingerprint.

17. The system of claim 13, the operations further comprising:

determining that the interaction is allowed under the second access scope associated with the second credential; and selecting, from a plurality of credentials, the second credential to be sent to the client device based at least in part on the interaction being allowed under the second access scope associated with the second credential.

18. The system of claim 13, the operations further comprising:

performing, by an identity provider system associated with the service provider network, the first authentication protocol with the client device;

providing the client device with the first credential based at least in part on completion of the first authentication protocol;

subsequent to sending the indication to the client device that performance of the interaction requires the second authentication protocol to elevate to the second access scope:

performing, by the identity provider system, the second authentication protocol with the client device; and providing the client device with the second credential based at least in part on completion of the second authentication protocol.

19. The system of claim 13, the operations further comprising:

receiving the API call including the second credential;

determining that the interaction is allowed under the second access scope of the second credential; and causing the service to perform the interaction associated with the API call.

20. The system of claim 13, the operations further comprising, wherein the pluggable authorizer component determines that performance of the interaction requires elevation from the first access scope to a second access scope, further comprising:

determining, by the pluggable authorizer component, a type of the stateless API gateway;

determining, based at least in part on the type of the stateless API gateway, a context according to which to communicate with the stateless API gateway;

generating, by the pluggable authorizer component and according to the context, a notification that the client device is to perform the second authentication protocol to elevate to the second access scope; and sending the notification to the stateless API gateway.

* * * * *